United States Patent
Gerber

(10) Patent No.: US 8,800,915 B2
(45) Date of Patent: Aug. 12, 2014

(54) DEVICE FOR BOUNDARY LAYER SUCTION AND COMPOSITE COMPONENT THEREFOR

(75) Inventor: Martin Gerber, Bremen (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/435,078

(22) Filed: Mar. 30, 2012

(65) Prior Publication Data

US 2012/0187252 A1 Jul. 26, 2012

Related U.S. Application Data

(63) Continuation of application No. PCT/EP2010/064503, filed on Sep. 29, 2010.

(60) Provisional application No. 61/247,024, filed on Sep. 30, 2009.

(30) Foreign Application Priority Data

Sep. 30, 2009 (DE) .......................... 10 2009 043 489

(51) Int. Cl.
*B64C 21/06* (2006.01)
*B64C 3/18* (2006.01)

(52) U.S. Cl.
USPC .......... 244/53 B; 244/87; 244/123.1; 244/130; 244/209

(58) Field of Classification Search
USPC ....... 244/53 B, 87, 130, 198, 208, 209, 123.1
See application file for complete search history.

(56) References Cited

U.S. PATENT DOCUMENTS

| | | | |
|---|---|---|---|
| 2,643,832 A * | 6/1953 | Thwaites | 244/200 |
| 2,742,247 A * | 4/1956 | Lachmann | 244/130 |
| 5,366,177 A * | 11/1994 | DeCoux | 244/201 |
| 5,591,511 A * | 1/1997 | Yasui | 428/138 |
| 6,216,982 B1 | 4/2001 | Pfennig et al. | |
| 6,752,358 B1 * | 6/2004 | Williams et al. | 244/208 |
| 7,152,829 B2 | 12/2006 | Bertolotti | |
| 7,234,668 B2 * | 6/2007 | Wollaston et al. | 244/132 |
| 7,673,832 B2 * | 3/2010 | Meister | 244/123.1 |
| 8,091,837 B2 | 1/2012 | Frankenberger et al. | |
| 2005/0178924 A1 | 8/2005 | Bertolotti | |
| 2007/0221788 A1 | 9/2007 | Meister | |
| 2007/0266707 A1 | 11/2007 | Meister et al. | |

FOREIGN PATENT DOCUMENTS

| | | |
|---|---|---|
| CN | 1812911 A | 8/2006 |
| CN | 101155727 A | 4/2008 |
| CN | 100436255 C | 11/2008 |
| DE | 936618 C | 12/1955 |

(Continued)

*Primary Examiner* — Rob Swiatek
(74) *Attorney, Agent, or Firm* — Lerner, David, Littenberg, Krumholz & Mentlik, LLP

(57) ABSTRACT

A device for boundary layer suction on the outer skin of an aircraft, on which outer skin a surface where drawing off by suction can take place comprising openings is connected to a suction source by way of at least one suction line, wherein the surface where drawing off by suction can take place is formed by at least one panel-shaped composite component that comprises an extruded profile, made of light metal, as a base body, which extruded profile comprises several suction channels that are open towards the outer skin, onto which base body, for the purpose of forming the outer skin, a micro-perforated metal cover sheet has been applied in the region of the surface where drawing off by suction can take place.

7 Claims, 2 Drawing Sheets

(56) References Cited

FOREIGN PATENT DOCUMENTS

| | | |
|---|---|---|
| DE | 1280057 B | 10/1968 |
| DE | 19820097 A1 | 11/1999 |
| DE | 102004024016 A1 | 12/2005 |
| EP | 0836989 A2 | 4/1998 |
| RU | 2362708 C2 | 7/2009 |
| SU | 1579620 A1 | 7/1990 |
| WO | 03089295 A2 | 10/2003 |
| WO | 2005113336 A1 | 12/2005 |
| WO | 2007144563 A1 | 12/2007 |

* cited by examiner

Detail A

DEVICE FOR BOUNDARY LAYER SUCTION AND COMPOSITE COMPONENT THEREFOR

CROSS-REFERENCE TO RELATED APPLICATIONS

This application is a continuation of International Application No. PCT/EP2010/064503, filed Sep. 29, 2010, which claims the benefit of the filing date of U.S. Provisional Patent Application No. 61/247,024, filed Sep. 30, 2009, and of German Patent Application No. 10 2009 043 489.5, filed Sep. 30, 2009, the disclosures of which applications are hereby incorporated herein by reference.

FIELD OF THE INVENTION

The invention relates to a device for boundary layer suction on the outer skin of an aircraft, on which outer skin a surface where drawing off by suction can take place comprising openings is connected to a suction source by way of at least one suction line. Furthermore, the invention also relates to a composite component for forming such a surface where drawing off by suction can take place, and to a method for manufacturing said composite component.

The field of application of the present invention relates to aircraft construction, in particular in relation to large commercial aircraft. Aerodynamic components of such commercial aircraft, for example engine nacelles, wings or the vertical stabilizer, can comprise a device for boundary layer suction on the outer skin in order to reduce frictional resistance. In a wing the airflow speeds up after it has passed the maximum curvature, and subsequently is slowed down again. In this process the boundary layer loses kinetic energy and becomes thicker. At the transition point the laminar boundary layer turns into turbulent airflow. As a consequence of this, frictional resistance increases.

In order to maintain laminar flow in the widest possible flight envelope over the largest possible part of the wing or some other aerodynamic part of the aircraft, any change of the boundary layer from laminar to turbulent must be prevented or displaced further downstream.

The suction of air within the boundary layer, which process is of interest in the present invention, provides one possible method of boundary layer stabilization. During suction, micro-apertures are installed in the critical regions of the profile surface, by way of which micro-apertures the laminar boundary layer generated is drawn off by suction in regions where boundary layer instability is present.

From DE 10 2004 024 016 A1 a generic device for boundary layer suction on the outer skin of a commercial aircraft is known. The device essentially comprises a surface where drawing off by suction can take place, which surface in this design is arranged on two positions of a wing. The surface where drawing off by suction can take place comprises a multitude of micro-apertures that communicate with a shared suction line that on the other end is coupled to a suction source.

DE 1 280 057 presents a technical solution for implementing the perforated surface where drawing off by suction can take place for boundary layer suction. In this arrangement the surface where drawing off by suction can take place, on the outer skin comprises several narrow suction slots that are arranged so as to be parallel to each other, which suction slots in the interior of the associated aerodynamic component comprise an aperture for chambers incorporated in an otherwise panel-shaped construction element. Underneath the slots, in the bottom region the chambers in each case comprise a number of small apertures that extend in the direction of the suction slots and that establish a connection to a respective guide channel situated underneath the aforesaid. The guide channels, whose number corresponds to the number of suction slots, are formed in the interior of the aerodynamic component by a curved corrugated metal sheet. The curved corrugated metal sheet provides adequate stability to the aerodynamic component in cooperation with a further corrugated metal sheet situated underneath the aforesaid and extending orthogonally to it. The outer skin constructed in this manner is attached to the structure, which in the present embodiment comprises frame elements with a T-cross section. The panel-shaped construction element that forms the outer skin is welded to the corrugated metal sheet.

The manufacturing expenditure of the individual construction elements and their installation appears to be disadvantageous in this prior art. In particular, the guide channels that convey negative pressure require tight welding of the connection between the corrugated metal sheet and the panel-shaped component that forms the outer skin. Moreover, manufacture of the suction slots provided in the aforesaid with a chamber situated underneath seems to be quite elaborate as a result of what is in principle a sandwich-like materials design. Furthermore, it is necessary for the corrugated metal sheet to be very precisely formed by bending in order to ensure consistent close fit against the panel-shaped component. Manufacturing tolerances occurring in this process can be bridged only to a very limited extent by weld seams.

Moreover, from the technical article "Schrauf G.: Status of Laminar Flow Technology, AIAA Fluid Dynamic Conference, June 2008" a composite construction for the manufacture of a surface where drawing off by suction for boundary layer suction can take place is known, in which in a first manufacturing step construction profile sections are affixed, by laser welding, to a perforated carrier sheet so as to be spaced apart and parallel to each other. Subsequently, by bending the carrier sheet the contour of the outer skin is formed, wherein the profile rails are arranged so as to be situated on the inside. This takes place by means of a bending device that determines the final shape. Lastly, the interior of the aerodynamic component formed in this manner is treated in order to provide the channel layout for the suction line. The carrier sheet is already pre-perforated so that the surface where drawing off by suction can take place, which surface has been created in this manner, is ready for operation after connection to a suction line.

The rather expensive and extensive process of laser welding the individual stringers is disadvantageous from the point of view of manufacturing technology. This results in long manufacturing times. Depending on requirements relating to aerodynamics and fluid mechanics, the width of the suction chamber at the leading edge varies more than fourfold, so that a great number of individual suction chambers are necessary, depending on the shape of the aerodynamic component.

BACKGROUND TO THE INVENTION

It is thus the object of the present invention to create a device for boundary layer suction with a composite component that forms the surface where drawing off by suction can take place, and to create a respective manufacturing method that makes it possible, with little expenditure and with reproducibly high quality, to efficiently manufacture a robust surface where drawing off by suction can take place.

The invention includes the device-related teaching according to which the surface where drawing off by suction can take place is formed by at least one panel-shaped composite component comprising an extruded profile of light metal as a base body, which extruded profile represents several suction channels open towards the outer skin, onto which base body, for the purpose of forming the outer skin, a micro-perforated metal cover sheet has been applied in the region of the surface where drawing off by suction can take place.

The solution according to the invention provides, in particular, an advantage in that by means of this composite component that is simple to manufacture a surface of any size and shape can be produced, from which surface drawing off by suction can take place. Because of the extruded base body the composite component is very stable, and the manufacturing method of extrusion molding ensures reproducibly high quality. Extrusion molding provides another advantage in that light metal can be used as a material, so that the composite component overall is of quite lightweight construction. Furthermore, with the use of the extruded profile there is no welding work involved, which is otherwise quite elaborate, to form the suction channels underneath the outer skin in the region of the surface where drawing off by suction can take place, and consequently the manufacturing time is also reduced.

Preferably, the suction channels, which have been formed according to the invention, of the surface where drawing off by suction can take place in the extruded profile should extend side by side so as to be spaced apart from each other in the direction of the wingspan of the aerodynamic component of the aircraft, which applies to so-called constant-chord profiles. Such a direction provides the composite component not only with mechanical stability but also with a favorable channel layout for efficient boundary layer suction.

In the case of a commercial aircraft the aerodynamic component on which the surface where drawing off by suction can take place is arranged can be the engine nacelle and/or the wings and/or the vertical stabilizer. Boundary layer suction in these aerodynamic components results in a significant reduction in the frictional resistance of the commercial aircraft, in that in those regions the favorable laminar flow is maintained.

According to a measure that improves the invention, it is proposed that for balancing the air mass flow an aperture be inserted into the suction line, which is preferably formed by the interior of the aerodynamic component, between the surface where drawing off by suction can take place and the suction source. By way of the size of the aperture the negative pressure acting on the surface where drawing off by suction can take place can be regulated in order to ensure efficient boundary layer suction with simple technical means. While as a rule it is not necessary to vary the throttle cross section, it is however also imaginable to regulate the air mass flow with an adjustable throttle instead of with an aperture.

The base body, which is preferably made as an extruded profile from the light metal aluminum or from an aluminum alloy, is to comprise a micro-perforated metal cover sheet preferably made from titanium or stainless steel in order to form the composite component. In titanium in a titanium alloy, or in stainless steel it is not only possible to place the micro-perforation in a simple manner from the point of view of production technique, but these preferred metals are also adequately corrosion-resistant for the application that forms the subject of the invention, in the region of the outer skin of the aircraft.

According to another aspect of the invention, the micro-perforated metal cover sheet is preferably firmly bonded or galvanized onto the extruded profile in the region of the open channels, with such bonding or galvanizing preferably taking place by means of a pulse-current method.

To manufacture such a rigid integral connection, the stringer heads of the extruded profile, which stringer heads establish contact with the metal cover sheet, are mechanically processed, for example by milling, in order to provide a very planar supporting surface for the metal cover sheet. This provides favorable prerequisites for subsequently establishing the integral connection so that finally a stable panel-shaped composite component results.

According to a further measure that improves the invention, it is proposed that micro-perforation be produced only after the metal cover sheet has been placed onto the extruded profile, namely preferably by laser beam drilling. Accordingly it is not necessary to produce micro-perforation prior to integrally connecting the metal cover sheet to the extruded profile.

In the case of, preferably subsequent, production of micro-perforation in the metal cover sheet, only those regions of the surface need to be perforated behind which there is an open suction channel. Thus, advantageously, the surface regions behind which there is a stringer head of the extruded profile can be left non-perforated so that the integral connection is not negatively affected by the micro-perforation. In this way micro-perforated suction channels arise, which preferably extend in the direction of the wingspan, for local boundary layer suction.

If the region of micro-perforation is to be enlarged to provide an improved suction removal effect, according to another advantageous improvement aspect of the invention it is proposed that the stringer heads of the extruded profile be chamfered so that a larger effective suction removal surface arises.

The integral connection, which has been produced by bonding or galvanizing the metal cover sheet onto the mechanically pre-processed extruded profile, generates a stable composite component. In the case of bonding it is proposed that an epoxy resin adhesive be applied to the stringer heads of the extruded profile, and subsequently the metal cover sheet be put in place under pressure. After the adhesive has cured, an even, rigid, adhesive connection exists that is to be provided with corrosion protection. If the integral connection is instead to be produced by galvanizing, it is proposed that the extruded profile in the region of the open suction channels first be filled with an electrically conductive wax. Depending on the spacing of the stringer heads this can also take place by inserting a wax-enclosed solid core in order to save wax material. After completion of galvanizing, the wax is to be removed by the application of heat.

BRIEF DESCRIPTION OF THE DRAWINGS

Further measures that improve the invention are presented in more detail below, together with a description of preferred exemplary embodiments of the invention with reference to the figures. The following are shown.

DETAILED DESCRIPTION OF EXEMPLARY EMBODIMENTS

Figure 1:
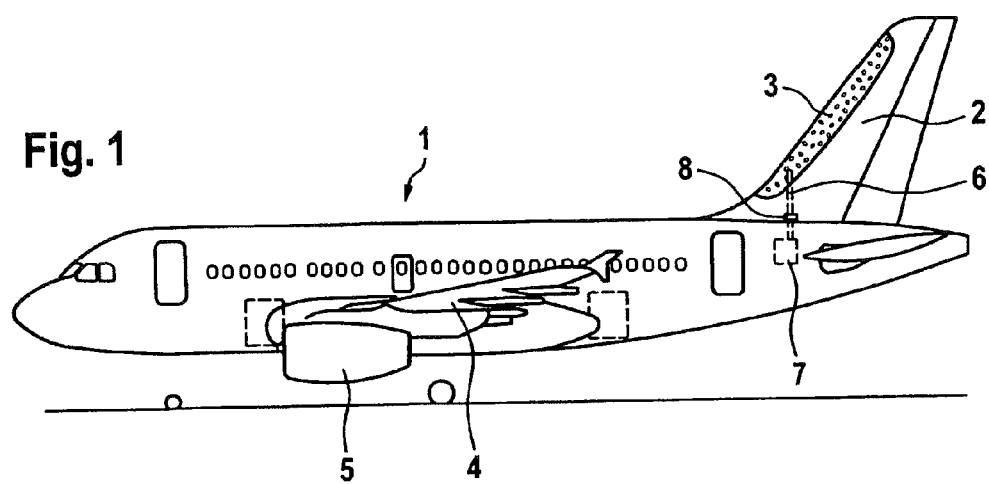
FIG. 1 a lateral view of a commercial aircraft with surfaces where drawing off by suction can take place for boundary layer suction on the outer skin, FIG. 2 a perspective view of part of the vertical stabilizer of the commercial aircraft according to FIG. 1 in the region of the surface where drawing off by suction can take place, FIG. 3 an enlarged section (detail A) from FIG. 2 in the region of the composite component, and FIGS. 4a-d a sequence of production steps for manufacturing the composite component.
Figure 2:
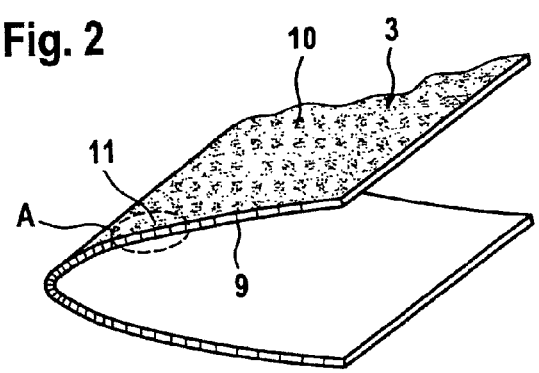

According to FIG. 1, on an outer skin 1 of the commercial aircraft, which in the diagram is shown as an example, in the region of the vertical stabilizer 2 there is a surface 3 where drawing off by suction can take place. Apart from this, similar surfaces where drawing off by suction can take place (not further shown in the diagram) are also arranged on other aerodynamic components, in the example shown on the wing 4 and on the engine nacelle 5, which surfaces form part of a device for boundary layer suction.

The surface 3 of the vertical stabilizer 2, on which surface 3 drawing off by suction can take place, is connected to a suction source 7, by way of a suction line 6 that is shown diagrammatically only, which suction source 7 for the purpose of boundary layer suction above the surface 3 generates the necessary negative pressure. For adjusting the air mass flow an aperture 8 has been inserted into the suction line 6 of the device for boundary layer suction.

The section of the surface 3, where drawing off by suction can take place, on the vertical stabilizer 2 (not shown in further detail) has a surface comprising minute openings 10 of approximately 40 to 100 micrometers, which surface is formed by a micro-perforated metal cover sheet 11 made of stainless steel, which metal cover sheet 11 together with an inside extruded profile 9 of aluminum, which extruded profile 9 forms a base body, forms a composite component.

Figure 3:
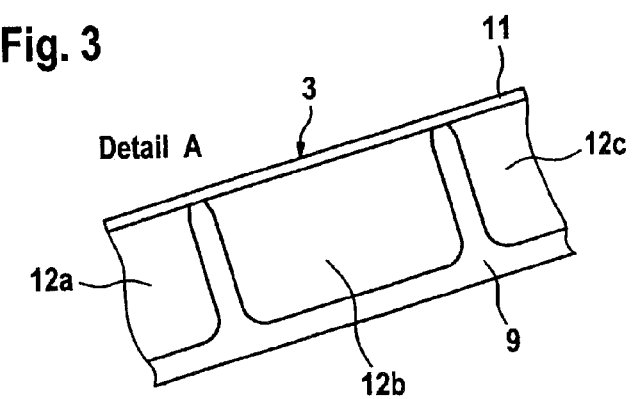

Detail A, shown in FIG. 3, of the composite component shows the cross section of the extruded profile 9 made of aluminum, which profile 9 forms several suction channels 12a-12c that are open towards the surface where drawing off by suction can take place, and as a result of the stable cross-sectional shape provides the composite component with the required stability. In order to form the outer skin that is exposed to airflow, the open suction channels 12a-12c of the extruded profile 9 have been closed by the micro-perforated metal cover sheet 11, which in this exemplary embodiment has been bonded on.

The sequence of FIGS. 4a-4d show an example of a method for manufacturing the above-described panel-shaped composite component that is used in the context of a vertical stabilizer.

Figure 4A:
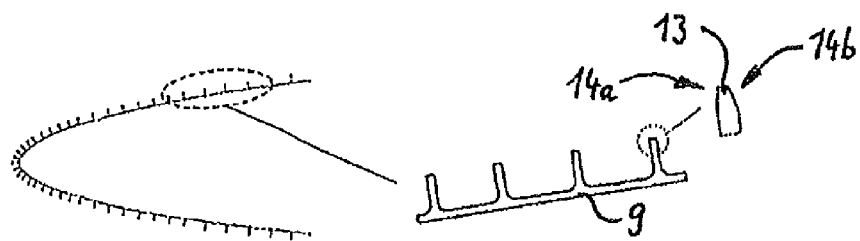

According to FIG. 4a, firstly mechanical processing of stringer heads 13 on the extruded profile 9 of aluminum takes place in order to create a planar supporting surface. In addition, the flanks 14a and 14b of the stringer head 13 have been chamfered by mechanical processing. In this embodiment, mechanical processing takes place by milling.

Figure 4B:
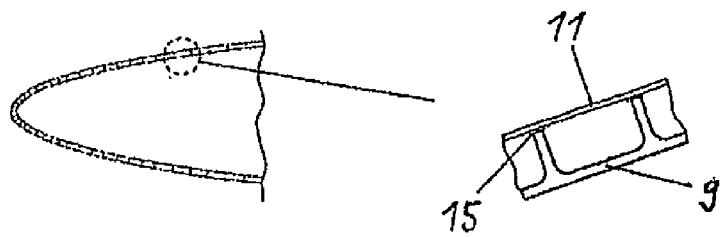

According to FIG. 4b, subsequently the metal cover sheet 11 is applied to the planar supporting surface of the extruded profile 9 and is firmly integrally connected to the aforesaid. In this exemplary embodiment the integral connection is established by way of an adhesive film 15. In this manner a stable panel-shaped composite component is created.

Figure 4C:
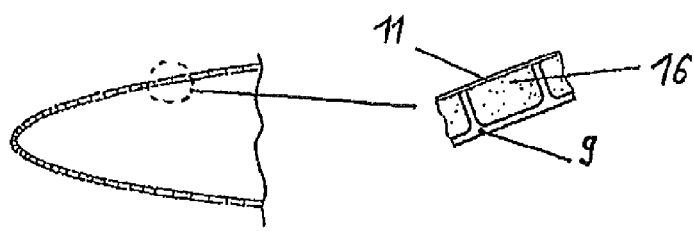

According to an alternative integral connection, shown in FIG. 4c, between the metal cover sheet 11 and the extruded profile 9, the latter is first filled with an electrically-conductive wax 16, which, after galvanizing the metal cover sheet in place, is melted out of the formed hollow spaces.

Figure 4D:
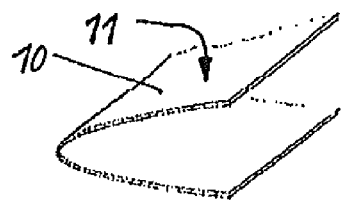

According to FIG. 4d, in the last manufacturing step placement of a multitude of openings 10 in the metal cover sheet 11 takes place by way of micro-perforation. Micro-perforation of the metal cover sheet 11 is produced by laser beam drilling.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Outer skin
2 Vertical stabilizer
3 Surface where drawing off by suction can take place
4 Wing
5 Engine nacelle
6 Suction line
7 Suction source
8 Aperture
9 Extruded profile
10 Openings
11 Cover plate
12 Suction channel
13 Stringer head
14 Flank
15 Adhesive film
16 Wax

The invention claimed is:

1. A composite component comprising a surface for boundary layer suction on the outer skin of an aircraft where drawing off by boundary layer suction can take place, the composite component comprising:
   a base body, the base body comprising an extruded profile made of a light metal,
   a plurality of stringers extruded from the base body and forming a plurality of open suction channels arranged next to one another on the base body, and
   a micro-perforated metal cover sheet made of titanium or a stainless steel as a corrosion-resistant metal applied to stringer heads thereby forming the surface where drawing off by boundary layer suction can take place.

2. The composite component according to claim 1, wherein the micro-perforated metal cover sheet is bonded or vulcanized onto the extruded profile thereby producing a firm integral connection.

3. The composite component according to claim 1, wherein the extruded profile comprises aluminum or an aluminum alloy.

4. An aerodynamic component of an aircraft comprising a composite component comprising a surface for boundary layer suction on the outer skin of an aircraft, the component comprising:
   a base body, the base body comprising an extruded profile made of a light metal,
   a plurality of stringers extruded from the base body and forming a plurality of open suction channels arranged next to one another on the base body,
   a micro-perforated metal cover sheet made of titanium or a stainless steel as a corrosion-resistant metal applied to stringer heads thereby forming the surface where drawing off by boundary layer suction can take place, and
   a suction source connected to the surface by the suction channels and at least one suction line;
   wherein the micro-perforated metal cover sheet is bonded or vulcanized onto the extruded profile thereby producing a firm integral connection; and
   wherein the stringer heads have planar support surfaces and chamfered first and second flanks.

5. The aerodynamic component according to claim 4, wherein the suction channels extend in the direction of a wingspan.

6. The aerodynamic component according to claim 5, wherein the aerodynamic component is an engine nacelle or a wing or a vertical stabilizer of a commercial aircraft.

7. The aerodynamic component according to claim 4, wherein the suction line comprises an aperture for balancing the air mass flow.

* * * * *